Oct. 4, 1932.  H. G. SCHNEIDER  1,881,137
BALANCING APPARATUS FOR AIRCRAFT
Filed Feb. 13, 1931   2 Sheets-Sheet 2
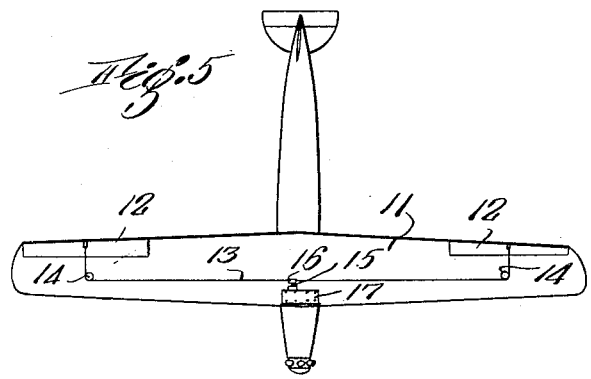
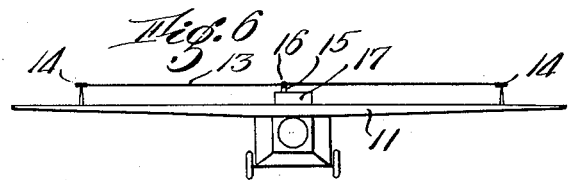
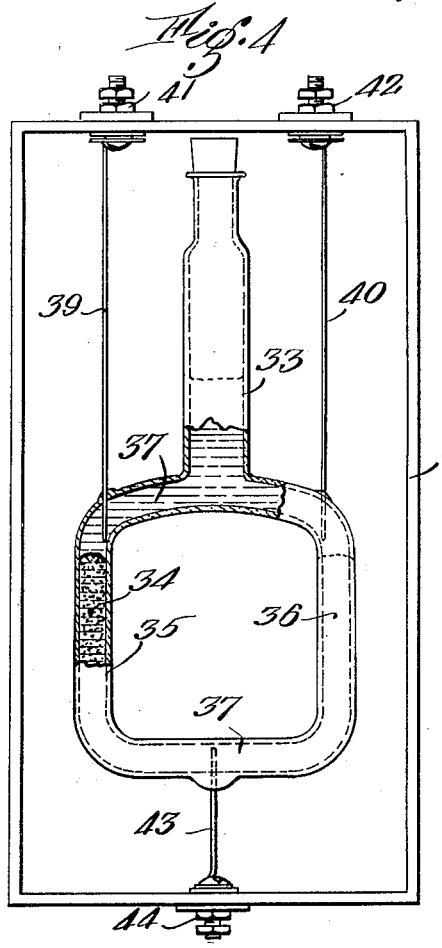
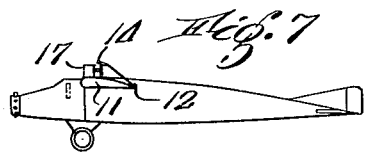
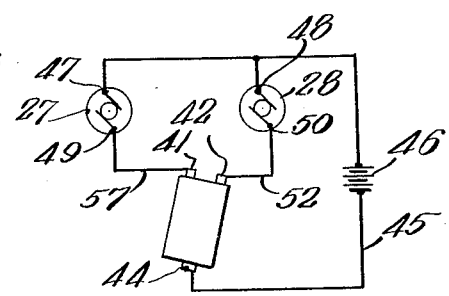
Inventor
Harold G. Schneider
By Henry C. Thomson
Atty.

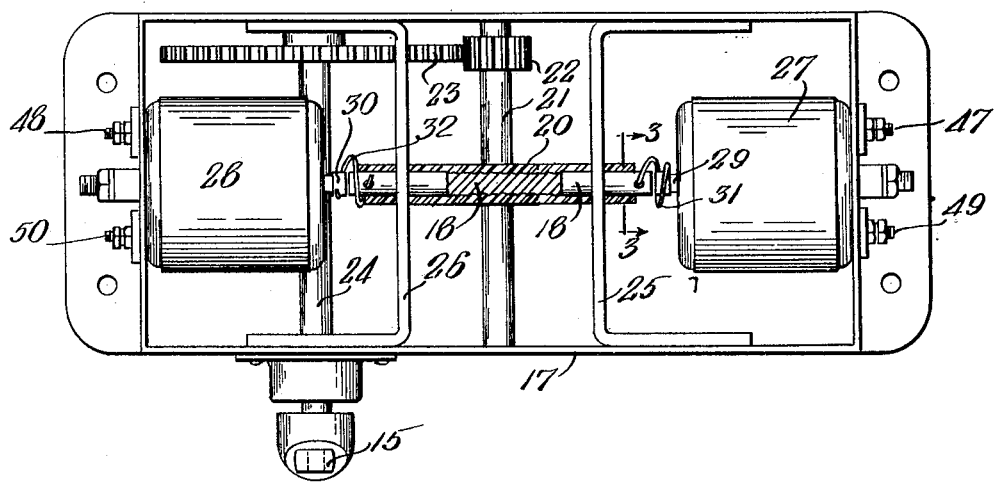
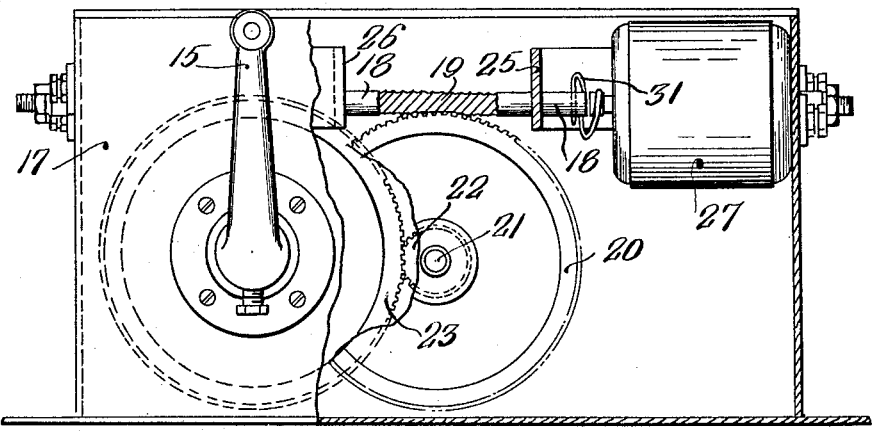
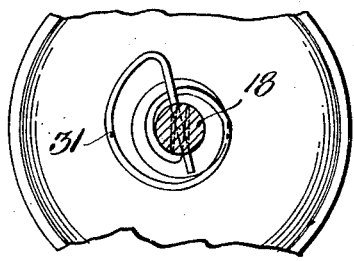

Patented Oct. 4, 1932

1,881,137

UNITED STATES PATENT OFFICE

HAROLD G. SCHNEIDER, OF WOLLASTON, MASSACHUSETTS, ASSIGNOR TO SCHNEIDER STABILIZER, INCORPORATED, OF BOSTON, MASSACHUSETTS

BALANCING APPARATUS FOR AIRCRAFT

Application filed February 13, 1931. Serial No. 515,584.

This invention relates to balancing or stabilizing apparatus for aircraft such as aeroplanes or the like having movable wing portions, elevators or ailerons adapted to react against air pressure to restore the equilibrium of the moving ship. The principal purpose of the invention is to provide simple and efficient balancing apparatus which is automatically actuable upon transverse tilting of the aircraft to move the ailerons or controlling wings and thereby restore the lateral level.

More specifically, the objects of the invention include the provision of a control cable connected to the respective ailerons of the opposite wings of an aeroplane, and a motor driven crank attached to the cable and adapted to move it longitudinally upon angular movement of the crank or operating lever, the crank being operated upon automatic energization of its driving motor; the provision of a driving shaft connected through suitable reduction gearing to the shaft of the crank, and means for selectively rotating the shaft in either direction to move the crank, cable and ailerons, in order to restore the equilibrium; and the provision of a pair of electric motors operatively connected to the opposite ends of the driving shaft, and an automatic switch actuable in response to lateral tilting of the aeroplane for alternatively energizing the respective motors, thereby to move the cable in the proper direction for restoring equilibrium.

Further features of the improved apparatus will be apparent from the following description, and will be pointed out in the appended claim. Although my invention is illustrated and described as applied to an aeroplane having the usual ailerons hinged to the rearward side of its lateral wings for correcting lateral balance, it will be apparent that the particular construction of the aeroplane is not essential to my invention, and that my stabilizing apparatus may be adapted to other types of aircraft. It will also be understood that the structural details of the apparatus herein described may be varied to suit particular purposes without departing from the essence of my invention.

A recommended embodiment of the invention is illustrated in the accompanying drawings, in which:

Fig. 1 is a plan view, partly in section of the crank and driving mechanism therefor;

Fig. 2 is a side view of said mechanism;

Fig. 3 is an enlarged section on line 3—3 of Fig. 1;

Fig. 4 is an elevation of a recommended form of automatic switch for actuating the motors of the driving mechanism;

Figs. 5, 6, and 7 are top, front and side views, respectively, of a monoplane equipped with the improved apparatus; and Fig. 8 is a wiring diagram illustrating a suitable electrical connection between the switch and the driving motors.

The wing 11 of the typical aeroplane shown in Figs. 5 to 7 has the usual pivoted ailerons 12 adjacent its opposite ends; and these ailerons are interconnected by a single cable 13 which passes over pulleys 14 and extends over the top of the wing 11 and which controls the movement of the respective ailerons so that both are moved simultaneously upon longitudinal movement of the taut cable to produce the same effect upon the lateral balance of the aeroplane. Both ailerons are horizontal as shown in the drawings, but it is apparent that movement of the cable in either direction will cause one aileron to be elevated and the other to be depressed (by air resistance and the action of gravity, supplemented by counter-acting springs or cables if necessary). As the present invention pertains particularly to the apparatus for operating the control cable 13, any common form or arrangement of cables, rods or links may be employed as the control element.

In accordance with this invention, a crank or lever 15 is suitably fixed to the cable or control member 13, preferably at its central portion as indicated at 16 (Fig. 6), so that the cable is moved longitudinally upon angular movement of the crank; and the crank is operated by driving mechanism preferably housed in a casing 17, which is automatically actuable by means of a suitable switch or other automatic control to move the lever in the proper direction for restoring lost equilibrium of the aeroplane.

As shown in Figs. 1 to 3, the driving mechanism preferably comprises a driving shaft 18 having a worm portion 19 engaging a worm wheel 20 whose shaft 21 has a small spur gear 22 meshing with a large gear 23 splined to the shaft 24 upon which the lever 15 is fixed exteriorly of the casing 17. The shaft 18 is journaled in transverse brackets 25, 26, spaced on opposite sides of its worm portion 19; and means are provided for rotating the shaft in either direction to move the crank and thereby automatically to counteract lateral tilting of the aeroplane. Said means preferably include a pair of electric motors 27 and 28 of common form mounted at opposite ends of the housing 17 and operatively connected to the opposite ends of the driving shaft 18.

For this purpose the armature shafts 29 and 30 of the respective motors are preferably aligned with the shaft 18; and yielding elements such as the coiled springs 31 and 32 are preferably provided for connecting the said armature shafts to the respective ends of the driving shaft, the ends of the springs being suitably secured to the corresponding shafts, as by passing them through radial openings therein (Fig. 3). It will be understood that the motor shafts 29 and 30 rotate in opposite directions when the motors 27 and 28 are alternatively energized, and it is apparent that the flexible connections 31 and 32 permit shaft 18 to be driven by either one of the motors without straining the shaft of the other motor.

The respective electric motors are alternatively energized by means of an automatic switch located in the circuit of the motor and actuable automatically in response to lateral tilting therof. A recommended form of switch is shown in Fig. 4, and comprises a tube or reservoir 33 partially filled with mercury 34 or other electrically conductive fluid, the reservoir having spaced vertical tube portions 35 and 36 and a communicating bottom portion 37 containing the mercury. The reservoir may be housed within a casing 38 which is mounted in upright position at the longitudinal axis of the aeroplane, for example in the cockpit, with the tube portions 35 and 36 disposed in a plane parallel to the lateral axis of the aeroplane. The upper portion of the reservoir may be filled with oil 37, if desired.

Conductors 39 and 40 extend from terminals 41 and 42 on the top of the casing 38 into the side tubes 35 and 36 of the reservoir; and another conductor 43 connects the mercury in the bottom 37 of the reservoir to a terminal 44. Said terminal 44 is connected by suitable wiring 45 through a battery 46 or other source of current to terminals 47 and 48 of the respective motors 27 and 28; and terminals 41 and 42 are connected to corresponding terminals 49 and 50 of the respective motors by wires 51 and 52 (Fig. 8).

In the normal, vertical position of the switch casing, the level of the mercury in the tube portions 35 and 36 is spaced below the inner or lower ends of the conductors 39 and 40, so that the electric circuit is normally open. However, if the switch is tipped transversely by the lateral tilting of the plane, the mercury will rise in one of the side tubes and complete the circuit between one of said conductors and the bottom conductor 43, thereby energizing one or the other of the motors 27 and 28. It will be understood that the electrical connections are so arranged that the closing of one of the motor circuits will drive the shaft 18 and move the lever 15 and cable 13 in the proper direction to counteract the forces which caused the tilting of the plane and switch to close the circuit. When equilibrium has thus been restored, the circuit will be reopened, as the mercury seeks its normal level.

It is thus apparent that the operation of the apparatus above described is extremely simple yet smooth and effective, the speed and degree of movement of the crank or lever 15 being suitably governed by the ratio of the reduction gearing of the operating mechanism. An aeroplane equipped with the improved stabilizing apparatus will ride at all times on an even keel without the constant attention and manual control of the pilot; and it will be obvious that a manually controllable switch may be incorporated in the circuit suggested to render the apparatus inoperative in case the pilot desires to bank or turn his plane. Further modifications in the mechanical structure or electrical arrangement herein set forth may be practiced, as above indicated, without departing from the scope of the appended claim.

Stabilizing apparatus for aircraft having angularly movable wing portions for maintaining its balance, comprising control elements connected to said wing portions and adapted upon longitudinal movement to cause angular movement of said portions, a crank for moving said elements, and mechanism automatically actuable in response to tilting of the aircraft for operating the crank in alternative directions, thereby to move the wing portions in opposite directions tending to restore the equilibrium of the aircraft, said mechanism comprising a shaft geared to the crank, electric motors located adjacent the opposite ends of the shaft and having their armatures flexibly connected to the respective shaft ends for alternatively rotating the shaft in opposite directions, a mercury switch located in the circuits of said motors and disposed in upright position at the axis of the air aircraft, said switch being open when the craft is level and automatically actuable upon tilting of the craft to close the circuit of one of the motors.

In testimony whereof I affix my signature.

HAROLD G. SCHNEIDER.